(12) United States Patent
Lopata

(10) Patent No.: US 8,234,511 B2
(45) Date of Patent: Jul. 31, 2012

(54) SPEED BINNING FOR DYNAMIC AND ADAPTIVE POWER CONTROL

(75) Inventor: Douglas D. Lopata, Boyertown, PA (US)

(73) Assignee: Agere Systems Inc., Allentown, PA (US)

( * ) Notice: Subject to any disclaimer, the term of this patent is extended or adjusted under 35 U.S.C. 154(b) by 447 days.

(21) Appl. No.: 12/446,881

(22) PCT Filed: Nov. 29, 2006

(86) PCT No.: PCT/US2006/061323
§ 371 (c)(1),
(2), (4) Date: Apr. 23, 2009

(87) PCT Pub. No.: WO2008/066548
PCT Pub. Date: Jun. 5, 2008

(65) Prior Publication Data
US 2010/0017042 A1    Jan. 21, 2010

(51) Int. Cl.
*G06F 1/32* (2006.01)
(52) U.S. Cl. .......................................... 713/320; 702/75
(58) Field of Classification Search ................. 713/300, 713/320; 702/75
See application file for complete search history.

(56) References Cited

U.S. PATENT DOCUMENTS

| | | | |
|---|---|---|---|
| 7,106,040 B1 | 9/2006 | Maksimovic et al. | |
| 7,117,378 B1 | 10/2006 | Maksimovic et al. | |
| 7,123,995 B1 * | 10/2006 | Desai et al. | 700/299 |
| 7,127,368 B2 * | 10/2006 | Choi | 702/130 |
| 7,137,013 B2 | 11/2006 | Abernathy et al. | |
| 7,590,509 B2 * | 9/2009 | Riedlinger et al. | 702/182 |
| 7,742,887 B2 * | 6/2010 | Patel et al. | 702/75 |
| 7,748,272 B2 * | 7/2010 | Kranz et al. | 73/493 |
| 2003/0082842 A1 * | 5/2003 | Hwu et al. | 438/54 |
| 2004/0128090 A1 | 7/2004 | Read et al. | |
| 2006/0020838 A1 | 1/2006 | Tschanz et al. | |
| 2006/0238230 A1 * | 10/2006 | Patel et al. | 327/261 |

FOREIGN PATENT DOCUMENTS

| | | |
|---|---|---|
| GB | 2408116 A | 5/2005 |
| WO | 2005050425 A1 | 6/2005 |

OTHER PUBLICATIONS

"PowerWise® Interface 2.0 Specification Revision 1.0," Oct. 1, 2003, PowerWise Interface Group (30 pages).
"PowerWise® Interface 2.0 Specification Revision 1.0," Sep. 16, 2005, PowerWise Interface Group (60 pages).

* cited by examiner

*Primary Examiner* — Glenn A Auve
(74) *Attorney, Agent, or Firm* — Mendelsohn, Drucker & Associates, P.C.; Yuri Gruzdkov; Steve Mendelsohn

(57) ABSTRACT

A representative digital circuit of the invention has an on-chip, non-volatile memory, to which chip-specific speed-binning data that characterize performance of the digital circuit are written during production testing. During normal operation, the power controller that controls power-supply signals applied to the digital circuit reads the speed-binning data from the on-chip memory for use as input parameters for dynamic supply-voltage scaling, dynamic clock scaling, and/or adaptive power control that optimize (e.g., minimize) power consumption in the digital circuit. Advantageously over the prior art, the accuracy and efficiency of dynamic and/or adaptive power control are improved because the chip-specific speed-binning data enable the power controller to better customize the power-management algorithm for the given digital circuit.

23 Claims, 3 Drawing Sheets

100

200

300

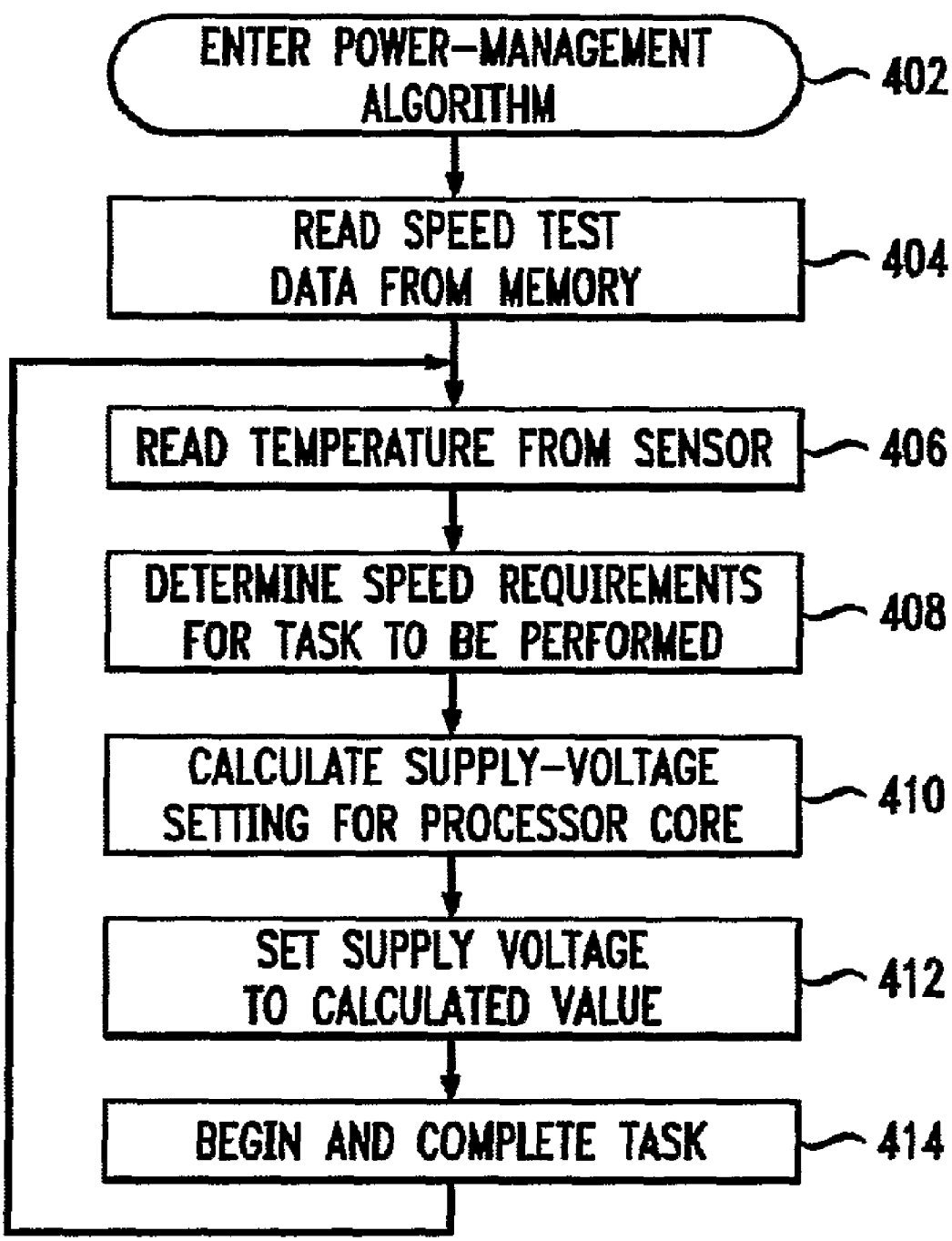

SPEED BINNING FOR DYNAMIC AND ADAPTIVE POWER CONTROL

BACKGROUND OF THE INVENTION

1. Field of the Invention

The present invention relates to power management of an integrated circuit (IC) and, more specifically, to dynamic and/or adaptive adjustment of a power-supply voltage for a digital processing component of the IC.

2. Description of the Related Art

An important criterion in evaluating the performance of an electronic device is its power consumption. The demand for data-intensive features in portable electronic devices has significantly increased the strain on the battery. Device manufacturers are challenged with offering new features, such as color displays, high-quality sound, web browsing, video streaming, gaming, etc., without sacrificing battery life and the device's form factor. Battery and power-conversion technologies have substantially reached a plateau that offers only modest advances in the near future. As a result, electronic device manufacturers seek to power new features through "smart" power management that leverages the already-existing power capacity so that both the additional power demands and consumer expectations can be met.

Two major components of smart power management are adaptive power control and dynamic power control. Adaptive power control relies on choosing the clock speed and/or supply voltage based upon the process corner that the electronic device was subject to when manufactured and the silicon temperature at which the device is operating. For example, relatively fast devices, which are characterized by relatively high silicon speeds, can be configured to run at lower supply voltages to achieve a desired operating speed, thereby reducing excess power drain on the battery. Dynamic power control relies on changing the clock frequency and/or supply voltage on the fly to respective relatively low (preferably minimum) value(s) that still enable the device to complete a pending task on time. The resulting power savings originate in the $CV^2 f$ nature of digital-circuit power consumption, where C is the effective capacitance of the digital circuit, V is the supply voltage, and f is the clock speed. While adaptive power control settings vary from device to device and are normally set one time per device, dynamic power control settings for each particular device vary over time relative to the adaptive power control setting of that device. Further power savings can be realized if the operating temperature of the device is factored into the determination of the supply voltage.

Representative examples of dynamic power control are disclosed, e.g., in U.S. Pat. No. 7,137,013, which is incorporated herein in its entirety. Representative examples of adaptive power control are disclosed, e.g., in U.S. Pat. Nos. 7,106,040 and 7,117,378, both of which are incorporated herein in their entirety. A representative example of combined dynamic and adaptive power control is embodied by the PowerWise™ technology described, e.g., in a white paper available from ARM Limited of the United Kingdom and National Semiconductor Corporation of Santa Clara, Calif. Due to the importance of smart power management, the development of suitable hardware architectures and hardware optimization represent an ongoing concern for electronic device manufacturers.

SUMMARY OF THE INVENTION

A representative digital circuit of the invention has an on-chip, non-volatile memory, to which chip-specific speed-binning data that characterize performance of the digital circuit are written during production testing. During normal operation, the power controller that controls power-supply signals applied to the digital circuit reads the speed-binning data from the on-chip memory for use as input parameters for dynamic supply-voltage scaling, dynamic clock scaling, and/or adaptive power control that optimize (e.g., minimize) power consumption in the digital circuit. Advantageously over the prior art, the accuracy and efficiency of dynamic and/or adaptive power control are improved because the chip-specific speed-binning test vectors can be optimized to the specific critical path(s) of the digital integrated circuit and enable the power controller to better customize the power-management algorithm for the given digital circuit.

According to one embodiment, the present invention is a device comprising: a power controller adapted to control one or more power-supply signals applied to a digital circuit; and a memory adapted to store speed-binning test data that characterize performance of said digital circuit, wherein the power controller is adapted to access said speed-binning test data to set one or more levels of said one or more power-supply signals.

According to another embodiment, the present invention is a power-management method comprising the steps of: applying one or more power-supply signals to a digital circuit; and reading speed-binning test data that characterize performance of said digital circuit from a memory to set one or more levels of said one or more power-supply signals.

According to yet another embodiment, the present invention is a method of testing a digital circuit, comprising the step of storing in a memory speed-binning test data that characterize performance of the digital circuit, wherein the digital circuit comprises: the memory; and a power controller adapted to: (i) control one or more power-supply signals applied to the digital circuit; and (ii) access said speed-binning test data to set one or more levels of said one or more power-supply signals.

BRIEF DESCRIPTION OF THE DRAWINGS

Other aspects, features, and benefits of the present invention will become more fully apparent from the following detailed description, the appended claims, and the accompanying drawings in which:

FIG. 4 shows a flowchart of a power-management method that can be used in the chipset of FIG. 1 according to one embodiment of the invention.

DETAILED DESCRIPTION

Figure 1:
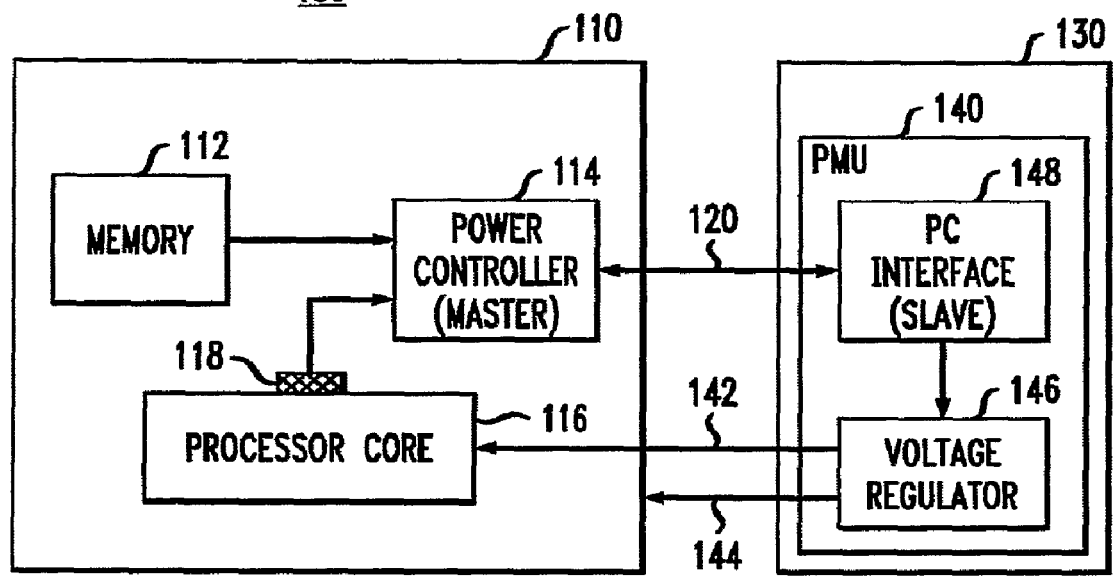
FIG. 1 shows a block diagram of a chipset according to one embodiment of the invention.

FIG. 1 shows a block diagram of a chipset 100 according to one embodiment of the invention. Chipset 100 has a digital integrated circuit (IC) 110 and an analog IC 130, both powered by a battery (not shown). In one embodiment, ICs 110 and 130 are digital base-band (DBB) and analog base-band (ABB) circuits, respectively, for cellular telephony. One skilled in the art will appreciate that chipset 100 can also be realized as a single, mixed IC that integrates both DBB and ABB circuit functions.

Analog circuit 130 has a power management unit (PMU) 140 that converts the power of the battery into a plurality of power-supply signals for digital IC 110, of which only two power-supply signals, i.e., signals 142 and 144, are shown for clarity. Illustratively, signal 142 represents a VDD voltage applied to a processor core 116 of digital IC 110, and signal 144 represents a VDD voltage used in that IC to power phase-locked loops (PLLs), reference oscillators, and various housekeeping functions. Based on a control signal 120 generated by a power controller (PC) 114 located in digital IC 110, PMU 140 can adjust voltage levels of signals 142 and 144, with the former signal being subject to both dynamic and adaptive power control and the latter signal being subject to adaptive power control only.

PC 114 is a digital processor, which is programmed to run the power-management software that enables the PC to determine supply voltages that optimize (e.g., minimize) power consumption in digital IC 110. This supply-voltage determination is communicated, via control signal 120, to a PC interface circuit 148 of PMU 140, with PC 114 and the PC interface circuit acting as a master and a slave, respectively. In one embodiment, PC interface circuit 148 contains a set of registers (not individually shown) that controls a set 146 of voltage regulators (not individually shown). Each voltage regulator in set 146 is adapted to generate a respective power-supply signal, with signals 142 and 144 being two examples of such power-supply signals. The voltage level of each power-supply signal is determined by the data word stored in the corresponding register of PC interface circuit 148. For example, the voltage level of signal 142 is linearly controlled to be between the minimum and maximum rated output voltages of the respective voltage regulator by the data word stored in the respective register of PC interface circuit 148. In one embodiment, PC 114, PC interface circuit 148, and control signal 120 comply with the PowerWise™ Interface Specification and/or PowerWise™ Interface 2.0 Specification issued by PowerWise™ Interface Group in 2003 and 2005, respectively. Both of these specifications are incorporated herein by reference in their entirety.

The power-management software run by PC 114 generally relies on the fact that the operational speed of a digital device is substantially proportional to the supply voltage. The slope of this speed-versus-voltage curve is substantially independent of silicon-process-related speed variations observed on a device-by-device or wafer-by-wafer basis. In contrast, the intercept of the speed-versus-voltage curve is highly dependent upon silicon-process speed. As a result, a relatively slow (in terms of silicon process) device will require a higher VDD voltage than a relatively fast device to be able to run at the same speed. Yet, the sensitivity of both devices to VDD changes will be relatively similar. For example, the sensitivity to VDD changes for devices implemented using a 90-nm silicon-process technology is typically in the range of 3-4 mV/Hz. The slope and intercept values of the speed-versus-voltage curve(s) are generally provided to the power management software as input parameters to realize, as known in the art, dynamic supply-voltage scaling, dynamic clock scaling, and/or adaptive power control. Accordingly, the power-management software controls the voltage levels applied to processor core 116 to run the processor core at a relatively low clock speed that still meets the demands of a particular application/task and the constraints of the silicon hardware. The use of relatively low clock speeds and the correspondingly low supply voltages in turn minimize the drain on the battery.

Prior-art approaches to providing chip-specific input parameters to the power-management software typically rely on some sort of emulation of the critical paths (i.e., those paths having the longest signal propagation delays) in the device. For example, a prior-art digital IC might incorporate an active loop adapted to sense the speed of a sub-circuit built into the silicon specifically to enable speed sensing. The speed-sensing data are then used to generate the necessary input parameters for the power-management software. However, one problem with this prior-art approach is that the built-in sub-circuit needs to correlate very well with the actual critical path(s) of the device. Since the critical paths often differ from product to product, the one-size-fits-all approach is not suitable for adaptive power control across a product family, and different specialized sub-circuits need to be designed for different products.

Problems in the prior art are addressed by incorporating, into digital IC 110, a non-volatile memory 112 that is adapted to store chip-specific characterization data generated during production testing as described in more detail below. During normal operation, those chip-specific data are retrieved from memory 112 by PC 114 and used therein as input parameters for the power-management software. Advantageously over the prior art, the accuracy and efficiency of dynamic and adaptive power control are improved because actual (as opposed to emulated) critical-path data are provided to the power-management software. This advantage is illustrated, for example, by the fact that the production test vectors generate stored speed data that automatically take into account the impact of supply-voltage droop that occurs within the power busses of the device during high load/high current operation, which emulated critical-path data do not.

Digital IC 110 further includes an optional temperature sensor 118 adapted to measure the temperature of processor core 116. A temperature reading is provided to PC 114 and used therein as an additional input parameter for the power-management software. Since the temperature effect on the operation of processor core 116 is known, the temperature parameter enables PC 114 to take temperature variations into account in the determination of voltage levels for signals 142 and 144, thereby further improving power efficiency of chipset 100.

In one embodiment, memory 112 is a one-time programmable (OTP) fuse block, the register corresponding to signal 142 in PC interface circuit 148 is designed to store five bits, and the respective voltage regulator in set 146 is a buck switched-mode power supply (SMPS) with 25-mV programmability across a range of 0.8-1.5 V. Given the 25-mV programmability and assuming a 4 mV/MHz VDD sensitivity for processor core 116, this embodiment enables adjustments of the operational speed in increments of about 6.25 MHz (=25/4) up to about 32×6.25 MHz.

Figure 2:
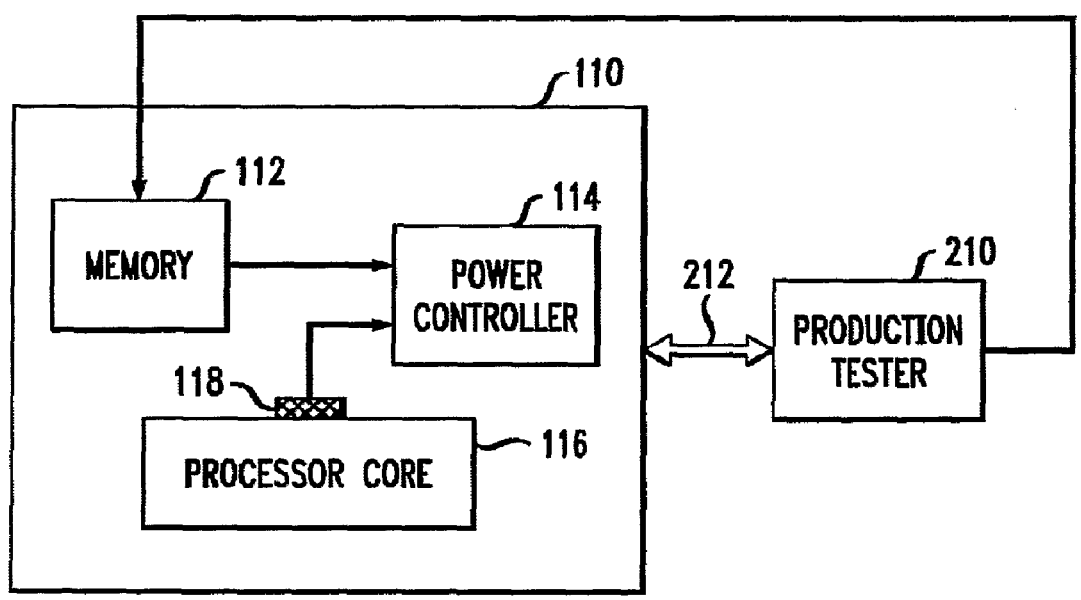
FIG. 2 shows a block diagram of a testing arrangement that can be used to test and configure a digital integrated circuit of the chipset shown in FIG. 1 according to one embodiment of the invention.

FIG. 2 shows a block diagram of a testing arrangement 200 that can be used to test and configure digital IC 110 (FIG. 1) according to one embodiment of the invention. Arrangement 200 has a production tester 210 to which digital IC 110 is coupled via an interface 212 for post-fabrication evaluation. During this evaluation, digital IC 110 is subjected to a set of production test vectors, as known in the art. Some of those test vectors are specifically designed to speed-bin the chips of the model to which digital IC 110 belongs, which vectors are referred to hereinafter as speed-binning test vectors. More specifically, speed binning is the practice of characterizing and/or sorting chips on the basis of performance in a switching-speed test. It is known that, even when chips of the same model are manufactured using the same process and even on the same mother die, there are chip-to-chip variations in performance that result from process variances. Speed binning is directed at quantifying those variations. In one embodiment, production tester 210 is an HP 93000 SOC Series test system commercially available from Agilent Technologies, Inc. of Santa Clara, Calif.

Using arrangement 200, digital IC 110 is speed-binned at a relatively high resolution (e.g., equal to or finer than the minimum operational speed increment available in chipset 100) by means of multiple passes of appropriate production test vectors. During each pass, production tester 210 uses a different supply voltage and tests the critical paths of digital IC 110 for pass/fail. Production tester 210 then stores the test results, such as the minimum supply voltage at which digital IC 110 passed each test vector, in memory 112. During normal operation of digital IC 110 as part of chipset 100, the test data stored in memory 112 are accessed by PC 114 and used as input parameters for the power-management software, allowing the software to set voltage levels of power-supply signals (e.g., signal 142) to optimum values appropriate for the type of task being performed by processor core 116.

Figure 3:
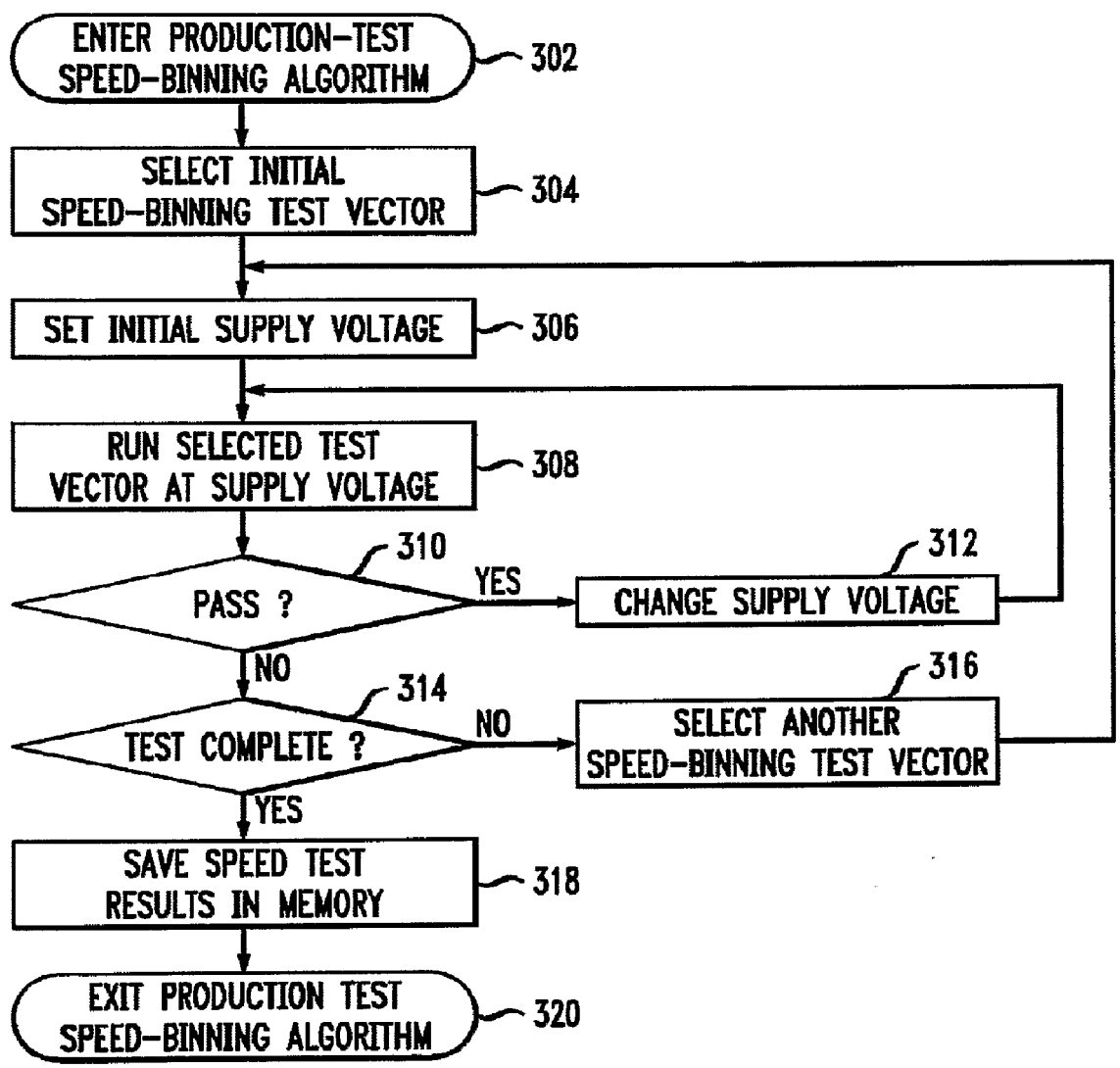
FIG. 3 shows a flowchart of a testing method that can be used in the testing arrangement of FIG. 2 according to one embodiment of the invention.

FIG. 3 shows a flowchart of a testing method 300 that can be used in arrangement 200 (FIG. 2) according to one embodiment of the invention. Method 300 begins at step 302 when production tester 210 enters a speed-binning algorithm. At step 304, tester 210 selects, from a plurality of available speed-binning test vectors, an initial test vector. At step 306, tester 210 sets and applies an initial supply voltage to the chip having digital IC 110 that is being tested. At step 308, tester 210 runs the selected test vector through the chip having digital IC 110 at the currently set supply voltage. At step 310, it is determined whether the chip has passed the test conducted at step 308. If the chip has passed the test, then the processing of method 300 is directed to step 312 where, without changing the selected test vector, tester 210 changes the supply voltage. As already indicated above, the incremental increase or decrease of the operating speed in step 312 is preferably equal to or finer than the minimum operational speed increment available in chipset 100. The processing of method 300 is then returned to step 308, and steps 308-312 are repeated one or more times until the chip having digital IC 110 fails the test corresponding to the presently selected test vector at some relatively high and/or low supply voltage. The highest and/or lowest operating speed at which the chip having digital IC 110 passes the test normally designates the speed bin, into which that chip falls with respect to that test vector.

If it is determined at step 310 that the chip having digital IC 110 has failed the test, then the processing of method 300 is directed to step 314, where it is determined whether further testing of the chip is to be performed. If it is determined at step 314 that further testing will be performed, then the processing of method 300 is directed to step 316, where tester 210 selects, from the plurality of available speed-binning test vectors, a next test vector. Tester 210 then repeats the above-described sequence of steps 306-312 with this next test vector. The processing loop having steps 306-314 is repeated one or more times until tester 210 has run all appropriate test vectors through the chip under test.

If it is determined at step 314 that the speed-binning test has been completed, then the processing of method 300 is directed to step 318. At step 318, tester 210 saves the test results in non-volatile memory 112 (also see FIG. 2) for further use during normal operation of digital IC 110 as part of chipset 100. Such test results may include, e.g., for each production test vector, the highest and/or lowest operational speeds or supply voltages at which the chip has passed the respective test. Method 300 is terminated at step 320 when production tester 210 exits the speed-binning algorithm. The addition of method 300 to the overall chip testing procedure is expected to add about 200 ms of extra testing time. At present loading rates, this extra time corresponds to a product cost increase of less than about 0.5 cents per chip. For a 90-nm silicon-process technology, this cost increase is equivalent to the cost of silicon area that is smaller than about 0.06 $mm^2$.

In one embodiment, method 300 can be repeated several times at respective different temperatures, and the corresponding test data stored in memory 112. Alternatively, method 300 can be run at one selected temperature, and the power-management can incorporate a subroutine that extrapolates the chip response from that selected temperature to other temperatures. This extrapolation can be used, for example, when during operation the actual device temperature deviates from the temperature used at execution of method 300.

FIG. 4 shows a flowchart of a power-management method 400 that can be used in chipset 100 (FIG. 1) according to one embodiment of the invention. Method 400 begins at step 402 when PC 114 activates a power-management algorithm. At step 404, PC 114 reads from memory 112 the speed-binning data stored therein during the execution of method 300 (see FIG. 3). As already explained above, the speed-binning data are used by the power-management software run by PC 114 as chip-specific input parameters. At step 406, PC 114 optionally reads, from sensor 118, the temperature of processor core 116 (see FIG. 1). As explained above, the temperature value is used by power-management software as an (additional and optional) input parameter. At step 408, PC 114 determines the speed requirements (constraints) for a task scheduled to be performed by processor core 116. For example, in cellular telephony, processor core 116 runs a plurality of tasks, such as cellular call processing, MP3 playback, base-station monitoring, and MPEG encode and decode. Each of these tasks needs to be completed within an appropriate time frame to ensure the integrity and continuity of the communications exchange, e.g., between the handset having digital IC 110 and a base station. Based on the processing content and the targeted start and end times for each task, the corresponding lowest processing speed can be ascertained and used by the power-management algorithm as yet another input parameter.

At step 410, using the input parameters provided at steps 404-408, PC 114 calculates a supply-voltage level that is appropriate for processor core 116 to use while executing the scheduled task to minimize power drain on the battery. PC 114 then communicates, via signal 120, the calculated supply-voltage level to PC interface circuit 148, where it is stored in an appropriate register. At step 412, a respective voltage regulator of set 146 generates power-supply signal 142 having the voltage level specified in that register. At step 414, having received the appropriately scaled power-supply signal 142, processor core 116 executes the scheduled task. The processing of method 400 is then directed back to step 406, or if appropriate to step 404, to manage power delivery to processor core 116 during the execution of a next scheduled task.

While this invention has been described with reference to illustrative embodiments, this description is not intended to be construed in a limiting sense. Although embodiments of the invention have been described in reference to supply voltages, the invention can also be practiced using slowing down the clock speed instead of or in addition to regulating supply voltages. Various modifications of the described embodiments, as well as other embodiments of the invention, which are apparent to persons skilled in the art to which the invention pertains are deemed to lie within the principle and scope of the invention as expressed in the following claims.

The present invention can be embodied in the form of methods and apparatuses for practicing those methods. Certain embodiments of the present invention can also be embodied in the form of program code embodied in tangible media, such as floppy diskettes, CD-ROMs, hard drives, or any other machine-readable storage medium, wherein, when the program code is loaded into and executed by a machine, such as a computer or production tester, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

Unless explicitly stated otherwise, each numerical value and range should be interpreted as being approximate as if the word "about" or "approximately" preceded the value of the value or range.

It should be understood that the steps of the exemplary methods set forth herein are not necessarily required to be performed in the order described, and the order of the steps of such methods should be understood to be merely exemplary. Likewise, additional stops may be included in such methods, and certain steps may be omitted or combined, in methods consistent with various embodiments of the present invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

I claim:

1. A device, comprising:
a processor core configured to receive a first power-supply signal;
a digital circuit configured to receive a second power-supply signal different from the first power-supply signal;
a power controller adapted to control the first and second power-supply signals; and
a memory adapted to store speed-binning test data that characterize performance of said processor core and said digital circuit, wherein the power controller is adapted to access said speed-binning test data to set one or more levels of said first and second power-supply signals.

2. The device of claim 1, wherein the power controller is adapted to use said speed-binning test data to customize at least one of adaptive power control and dynamic power control for said processor core and said digital circuit.

3. The device of claim 1, wherein the speed-binning test data has been generated and stored in said memory during production testing of the device, said speed-binning enabling adjustment of the first and second power supply signals with an increment corresponding to an operational speed increment of about 6 MHz.

4. The device of claim 3, wherein the speed-binning data comprise one or more supply voltages at which the digital circuit and the processor core have passed testing employing one or more respective speed-binning test vectors.

5. The device of claim 1, wherein the memory is a one-time programmable fuse block.

6. The device of claim 1, wherein the power controller is adapted to (i) determine a speed constraint for a task to be executed by the digital circuit and the processor core and (ii) specify one or more levels of said first power-supply signal for the execution of said task based on said speed constraint and said speed-binning test data.

7. The device of claim 1, further comprising a sensor adapted to sense temperature of the processor core, wherein the power controller is adapted to specify one or more levels of said first power-supply signal based on a temperature reading obtained from said sensor.

8. The device of claim 1, further comprising a power management unit adapted to:
receive instructions from the power controller regarding the one or more levels of said first and second power-supply signals; and
generate said first and second power-supply signals based on said instructions.

9. The device of claim 8, wherein the power controller and the power management unit comply with a PowerWise™ Interface Specification.

10. The device of claim 8, wherein:
the device is implemented using a chipset having first and second integrated circuits;
the memory, the power controller, the processor core, and the digital circuit are parts of the first integrated circuit; and
the power management unit is part of the second integrated circuit.

11. The device of claim 1, wherein the digital circuit and the processor core are parts of a digital base-band circuit for cellular telephony.

12. The device of claim 1, wherein:
the digital circuit comprises a phase-locked loop; and
the device is configured to apply the second power-supply signal to power said phase-locked loop.

13. The device of claim 12, wherein:
the digital circuit further comprises a reference oscillator; and
the device is further configured to apply the second power-supply signal to power said reference oscillator.

14. A power-management method, comprising:
applying a first power-supply signal to a processor core;
applying a second power-supply signal to a digital circuit, said second power-supply signal being different from the first power-supply signal; and
reading speed-binning test data that characterize performance of said processor core and said digital circuit from a memory to set one or more levels of said first and second power-supply signals, wherein the processor core, the digital circuit, and the memory are parts of a single integrated circuit.

15. The method of claim 14, further comprising:
customizing at least one of adaptive power control and dynamic power control for said processor core and said digital circuit using said speed-binning test data.

16. The method of claim 14, wherein the speed-binning test data has been generated and stored in said memory during production testing of the integrated circuit.

17. The method of claim 16, wherein the speed-binning test data comprise one or more supply voltages at which the integrated circuit has passed testing employing one or more respective speed-binning test vectors.

18. The method of claim 14, further comprising:
determining a speed constraint for a task to be executed by the integrated circuit; and
specifying one or more levels of said first power-supply signal for the execution of said task based on said speed constraint and said speed-binning test data.

19. The method of claim 14, further comprising:
sensing temperature of the processor core; and
specifying the one or more levels of said first power-supply signal based on the sensed temperature.

20. A method of testing an integrated circuit, comprising:
storing in a memory speed-binning test data that characterize performance of the integrated circuit, wherein the integrated circuit comprises:
a processor core configured to receive a first power-supply signal;
a digital circuit configured to receive a second power-supply signal different from the first power-supply signal;
the memory; and
a power controller adapted to:
control the first and second power-supply signals; and
access said speed-binning test data to set one or more levels of said first and second power-supply signals.

21. The method of claim 20, further comprising:
selecting a speed-binning test vector;
setting the second power-supply signal to a first voltage level;
running the selected speed-binning test vector through the digital circuit at said set voltage level;
determining whether the digital circuit passed a test employing the selected speed-binning test vector at said set voltage level;
if the digital circuit passed said test, setting the selected power-supply signal to a next voltage level; and
repeating the steps of running, determining, and setting to a next voltage level to determine a minimum supply voltage at which the digital circuit is able to pass the test employing the selected speed-binning test vector.

22. The method of claim 20, wherein the speed-binning test data comprise one or more supply voltages at which the digital circuit has passed testing employing one or more respective speed-binning test vectors.

23. Apparatus, comprising:
a digital processor configured to receive a first power-supply signal;
a digital circuit configured to receive a second power-supply signal, the second power supply signal being different from the first power-supply signal;
a power controller adapted to control the first and second power-supply signals;
a memory adapted to store speed-binning test data that characterize performance of said digital processor and said digital circuit, wherein the power controller is adapted to access said speed-binning test data to set at least one level of each of said first and second power-supply signals.

* * * * *